United States Patent
Loussides et al.

(10) Patent No.: US 10,482,776 B2
(45) Date of Patent: Nov. 19, 2019

(54) LANDING ZONE EVALUATION AND RATING SHARING AMONG MULTIPLE USERS

(71) Applicant: Sikorsky Aircraft Corporation, Stratford, CT (US)

(72) Inventors: George N. Loussides, West Haven, CT (US); Harshad S. Sane, Cupertino, CA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 156 days.

(21) Appl. No.: 15/710,328

(22) Filed: Sep. 20, 2017

(65) Prior Publication Data
US 2018/0090017 A1   Mar. 29, 2018

Related U.S. Application Data

(60) Provisional application No. 62/399,679, filed on Sep. 26, 2016.

(51) Int. Cl.
| | |
|---|---|
| *G08G 5/02* | (2006.01) |
| *B64D 45/08* | (2006.01) |
| *B64D 45/06* | (2006.01) |
| *B64D 47/08* | (2006.01) |
| *G08G 5/00* | (2006.01) |
| *B64D 45/00* | (2006.01) |

(52) U.S. Cl.
CPC ............ *G08G 5/025* (2013.01); *B64D 45/06* (2013.01); *B64D 45/08* (2013.01); *B64D 47/08* (2013.01); *G08G 5/0021* (2013.01); *B64D 2045/008* (2013.01); *G08G 5/0069* (2013.01)

(58) Field of Classification Search
CPC .... G08G 5/025; G08G 5/0021; G08G 5/0069; B64D 45/06; B64D 45/08; B64D 47/08; B64D 2045/008
See application file for complete search history.

(56) References Cited

U.S. PATENT DOCUMENTS

| | | |
|---|---|---|
| 7,651,050 B2 | 1/2010 | Lappos et al. |
| 8,521,343 B2 | 8/2013 | Spinelli |
| 8,600,589 B2 | 12/2013 | Mendez-Rodriguez et al. |
| 8,992,361 B2 | 3/2015 | Doleschel et al. |
| 9,085,225 B2 | 7/2015 | Halwes |
| 9,290,266 B2 | 3/2016 | Robertson et al. |
| 9,393,858 B2 | 7/2016 | Halwes |

(Continued)

*Primary Examiner* — Calvin Cheung
(74) *Attorney, Agent, or Firm* — Cantor Colburn LLP

(57) ABSTRACT

A landing zone evaluation and rating sharing system includes a central processor unit (CPU), at least one sensor input operatively connected to the CPU, a communication controller operatively connected to the CPU, the communication controller being operable to pass data to other systems associated with the aerial vehicle, and a landing zone (LZ) evaluation controller operatively coupled to a non-volatile computer readable storage medium having computer readable program instructions embodied therewith. The computer readable program instructions are executable by the central processor unit to receive data received through the at least one sensor input, evaluate the data to determine a LZ rating for a particular landing zone, and communicate the LZ rating to one or more systems associated with the aerial vehicle.

13 Claims, 1 Drawing Sheet

(56) References Cited

U.S. PATENT DOCUMENTS

| | | |
|---|---|---|
| 10,029,804 B1* | 7/2018 | Chamberlain ......... B64D 45/08 |
| 2011/0254706 A1 | 10/2011 | Lampazzi et al. |
| 2011/0285981 A1 | 11/2011 | Justice et al. |
| 2012/0176497 A1 | 7/2012 | Shadmi |
| 2013/0197789 A1* | 8/2013 | Bhadkaria ............... G06F 16/29<br>701/117 |
| 2014/0129058 A1 | 5/2014 | Elahi et al. |
| 2014/0379179 A1 | 12/2014 | Goossen et al. |
| 2015/0304813 A1 | 10/2015 | Esposito et al. |
| 2016/0027313 A1 | 1/2016 | Loussides et al. |
| 2016/0217578 A1 | 7/2016 | Can et al. |

* cited by examiner

LANDING ZONE EVALUATION AND RATING SHARING AMONG MULTIPLE USERS

CROSS REFERENCE TO RELATED APPLICATIONS

This application claims the benefit of U.S. Provisional Patent Application Ser. No. 62/399,679, filed Sep. 26, 2016, the entire contents of which are incorporated herein by reference.

BACKGROUND

Exemplary embodiments pertain to the art of landing zone evaluation systems and, more particularly, to a system for rating and sharing landing zone evaluations with multiple users.

Controllers of optionally piloted vehicles (OPVs) and unmanned aerial vehicles (UAVs) may rely on intelligence for information pertaining to potential landing sites. Intelligence may be derived from images, past range-sensor scans, past experience, and or past visual inspection. Intelligence may be outdated and or situations may be evolving that could impact landing site suitability for a given time period. Approaching and preparing for landing in an unsuitable environment may have a negative impact on mission efficacy.

BRIEF DESCRIPTION

Disclosed is a landing zone evaluation and rating sharing system including a central processor unit (CPU), at least one sensor input operatively connected to the CPU, a communication controller operatively connected to the CPU, the communication controller being operable to pass data to other systems associated with the aerial vehicle, and a landing zone (LZ) evaluation controller operatively coupled to a non-volatile computer readable storage medium having computer readable program instructions embodied therewith. The computer readable program instructions are executable by the central processor unit to receive data received through the at least one sensor input, evaluate the data to determine a LZ rating for a particular landing zone, and communicate the LZ rating to one or more systems associated with the aerial vehicle.

In addition to one or more of the features described above or below, or as an alternative, further embodiments could include a LZ update controller, wherein data received through the at least one sensor input includes data received by the LZ update controller from sensors directed toward a LZ.

In addition to one or more of the features described above or below, or as an alternative, further embodiments could include wherein the data received from sensors directed toward the LZ includes data pertaining to one of physical attribute and a geometrical attribute of the LZ.

In addition to one or more of the features described above or below, or as an alternative, further embodiments could include wherein the sensors directed toward the LZ include one of a light detecting and ranging (LiDAR) sensor, a radio detection and ranging (RADAR) sensor, and cameras directed toward the LZ.

In addition to one or more of the features described above or below, or as an alternative, further embodiments could include wherein data received through the at least one sensor input includes data received through sensors arranged to detect a condition of the aerial vehicle.

In addition to one or more of the features described above or below, or as an alternative, further embodiments could include wherein the sensors arranged to detect a condition of the aerial vehicle include one or more of a weight on wheels (WOW) sensor, an embedded inertial navigation system (EGI) sensor, an inertial measurement unit (IMU) sensor, an engine torque sensor, a collective sensor.

In addition to one or more of the features described above or below, or as an alternative, further embodiments could include wherein the LZ rating communicated to one or more systems associated with the aerial vehicle includes communicating the LZ rating to one or more additional aerial vehicles.

In addition to one or more of the features described above or below, or as an alternative, further embodiments could include wherein the LZ rating communicated to one or more systems associated with the aerial vehicle includes communicating the LZ rating to one or more ground stations.

Also disclosed is an aerial vehicle including an airframe, a prime mover coupled to the airframe, one or more aerodynamic surfaces supported by the airframe, one or more support members supported by the airframe, the one or more support members operable to facilitate a transition between air operations and ground operations, at least one sensor mounted to the airframe, and a landing zone evaluation and rating sharing system including a central processor unit (CPU), a landing zone (LZ) evaluation controller, at least one sensor input operatively connected to the at least one sensor, a communication controller operatively connected to the CPU, the communication controller being operable to pass data from the LZ evaluation controller to other systems associated with the aerial vehicle, and a LZ evaluation controller operatively coupled to a non-volatile computer readable storage medium having computer readable program instructions embodied therewith. The computer readable program instructions are executable by the central processor unit to receive data received from the at least one sensor, evaluate the data to determine a LZ rating for a particular landing zone, and communicate the LZ rating to one or more systems associated with the aerial vehicle.

In addition to one or more of the features described above or below, or as an alternative, further embodiments could include wherein the at least one sensor includes at least one sensor operatively coupled to the LZ update controller and directed toward a LZ.

In addition to one or more of the features described above or below, or as an alternative, further embodiments could include wherein the at least one sensor includes at least one of a light detecting and ranging (LiDAR) sensor, a radio detection and ranging (RADAR) sensor, cameras directed toward the landing zone.

In addition to one or more of the features described above or below, or as an alternative, further embodiments could include wherein the at least one sensor comprises an aerial vehicle sensor arranged to detect a condition of the aerial vehicle.

In addition to one or more of the features described above or below, or as an alternative, further embodiments could include wherein aerial vehicle sensor includes at least one of a weight on wheels (WOW) sensor, an embedded inertial navigation system (EGI) sensor, an inertial measurement unit (IMU) sensor, an engine torque sensor, a collective sensor.

In addition to one or more of the features described above or below, or as an alternative, further embodiments could include wherein the landing zone rating communicated to one or more systems associated with the aerial vehicle includes communicating the landing zone rating to one or more additional aerial vehicles.

In addition to one or more of the features described above or below, or as an alternative, further embodiments could include wherein the landing zone rating communicated to one or more systems associated with the aerial vehicle includes communicating the landing zone rating to one or more ground stations.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
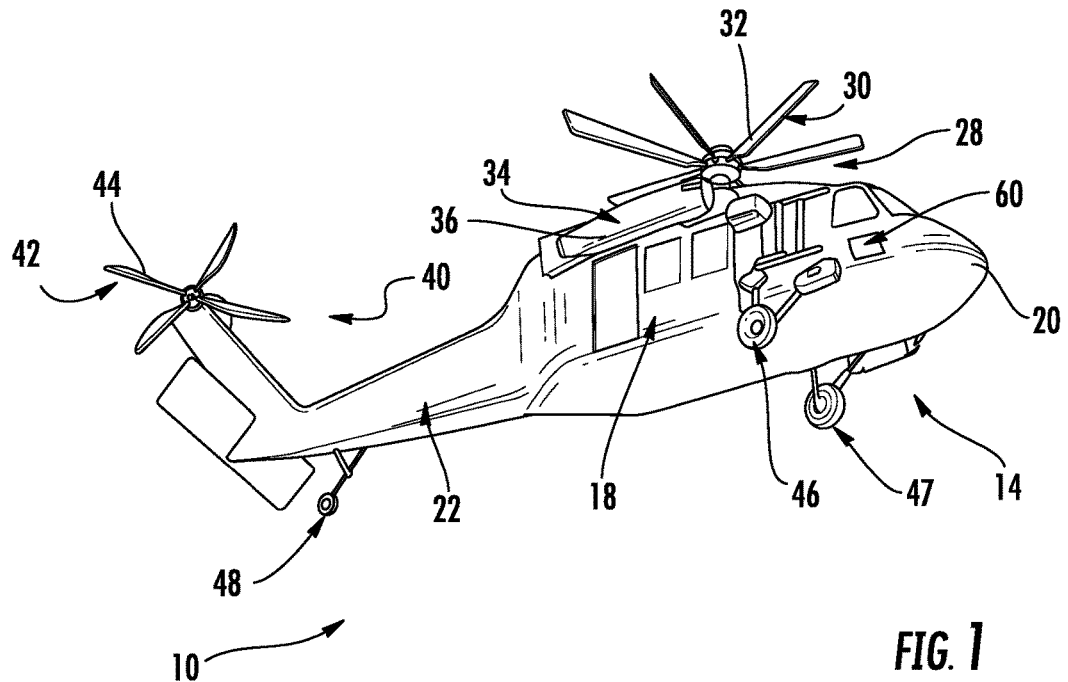
FIG. 1 depicts an unmanned aerial vehicle including a landing zone evaluation and sharing system, in accordance with an exemplary embodiment.

An unmanned aerial vehicle (UAV), in accordance with an exemplary embodiment, is indicated generally at 10 in FIG. 1. UAV 10 is shown in the form of a rotary wing aircraft 14. It is to be understood that UAV 10 may take on a variety of forms including fixed wing aircraft, rotary wing aircraft and the like. It is also to be understood that UAV 10 may also take the form of an optionally piloted vehicle (OPV).

Rotary wing aircraft 14 includes an airframe 18 having a nose section 20 and an extended tail section 22. Airframe 18 supports a main rotor assembly 28 including a plurality of rotor blades, one of which is indicated at 30. Each of the plurality of rotor blades 30 includes one or more aerodynamic surfaces 32. Plurality of rotor blades 30 is operatively coupled to a prime mover 34 which may take the form of an engine 36. Extended tail section 22 supports a tail rotor assembly 40 having a plurality of tail rotor blades, one of which is indicated to 42. Each of the plurality of tail rotor blades 42 includes one or more aerodynamic surfaces 44. Airframe 18 is also shown to include a plurality of support members, shown in the form of first and second front wheels 46 and 47 and a rear wheel 48. It is to be understood that support members may take on a variety of forms and are not limited to wheeled members. It is to be further understood that although a particular helicopter configuration is illustrated and described in the disclosed embodiment, other configurations and/or machines, such as high speed compound rotary wing aircraft with supplemental translational thrust systems, dual contra-rotating, or co-rotating coaxial rotor system aircraft, turbo-props, tilt-rotors and tilt-wing aircraft.

In accordance with an exemplary embodiment, rotary wing aircraft 14 includes a landing zone (LZ) evaluation and rating sharing system 60 that evaluates and rates, in real time a potential LZ. The evaluation and rating may compare current, perceived conditions with stored intelligence to determine a LZ rating. The LZ rating and evaluation criteria may then be shared with other aerial vehicles, manned and unmanned, as well as ground control units. LZ rating may include ground conditions, weather conditions, route into the LZ, route out of the LZ, location of hazards, location of entities of interest (EOIs) including both unfriendly ground personnel and/or the location of friendly ground personnel.

Figure 2:
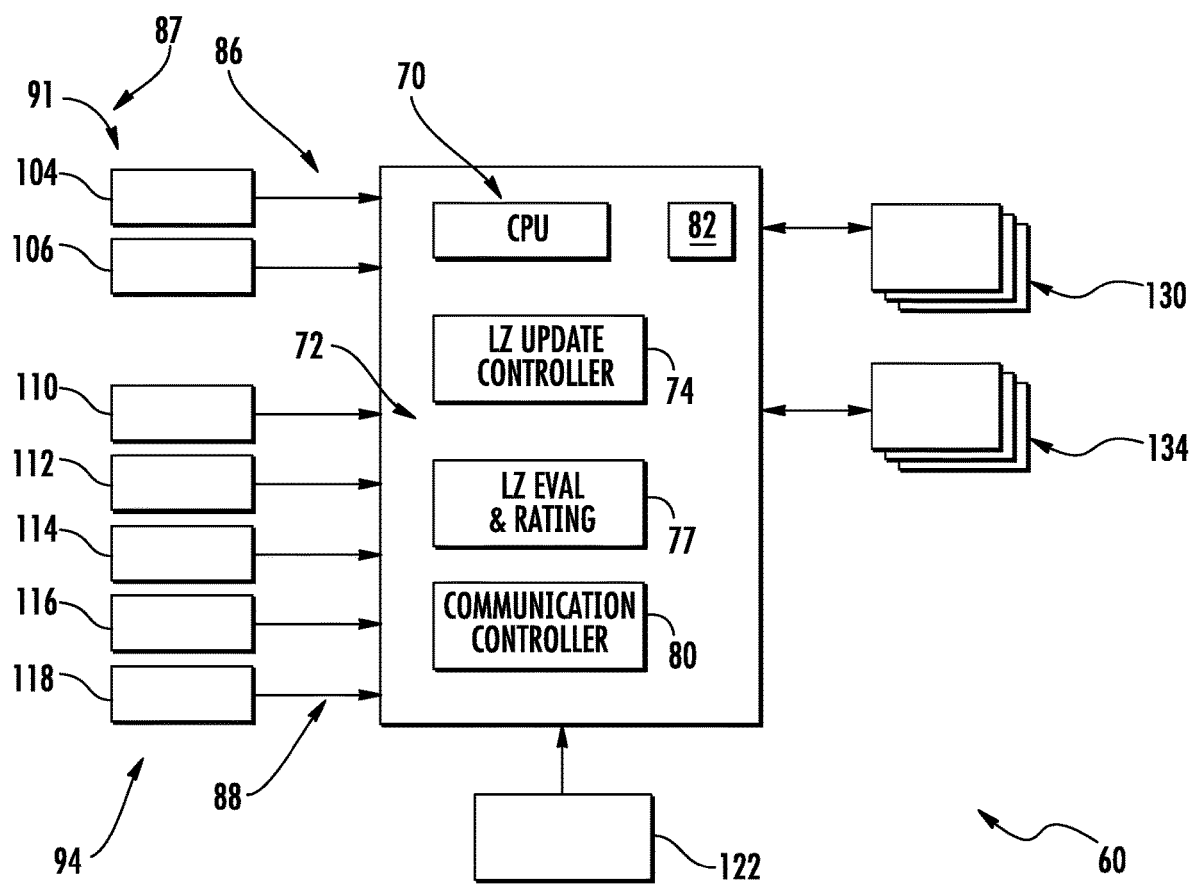
FIG. 2 is a block diagram illustrating the landing zone evaluation and sharing system, in accordance with an aspect of an exemplary embodiment.

As shown in FIG. 2, LZ evaluation and rating sharing system 60 includes a central processor unit (CPU) 70, and one or more LZ evaluation modules or controllers 72. For example, LZ evaluation and rating sharing system 60 may include a LZ update module or controller 74 and a LZ evaluation and rating controller 77. LZ evaluation and rating sharing system 60 may also include a communication module or controller 80 and a non-volatile memory 82. Communication module 80 may be operatively connected to one or more ground stations or other vehicles through various networking methodologies including satellite communication (SATCOM) protocols, a global positioning system (GPS) protocol such as Blue Force Tracks, line-of-Sight links, and the like. Communication protocols may include line of sight (LOS) protocols and beyond line of sight (BLOS) protocols.

LOS protocols may include various types of instantiations organized into a heterogeneous network (not all radios are of the same type or same frequencies). Entities can communicate with each other via a centralized base station or directly. Network types are cellular, military/commercial radios, Wi-Fi, etc. A Centralized base station or a super node may be able to translate a same message type from different sources on different frequencies and channels. There could be several super-nodes, typically located at forward operating bases or aerial communication platform (e.g. C-130). BLOS protocols may involve Satellites, Aerial communication platform (such as AWACS) or other form of relay platform.

In accordance with an aspect of an exemplary embodiment, LZ evaluation and rating sharing system 60 further includes a plurality of LZ sensor inputs 86 and a plurality of aerial vehicle sensor inputs 88. LZ sensor inputs 86 receive data from one or more LZ sensors 91 directed toward an LZ and aerial vehicle sensor inputs 87 may receive data from one or more aerial vehicle sensors 94 that detect various parameters associated with rotary wing aircraft 14.

For example, LZ sensors 91 may include a light detecting and ranging (LiDAR) sensor 104, radio detection and ranging (RADAR) sensor 105 and/or cameras 106. Aerial vehicle sensors 94 may include one or more of a weight on wheels (WOW) sensor 110, an embedded inertial navigation system (EGI) sensor 112, an inertial measurement unit (IMU) sensor 114, an engine torque sensor 116, and a collective sensor 118. LZ evaluation and rating sharing system 60 may also include a landing phase input 122 that identifies a landing stage, approach, touchdown, departure, of rotary wing aircraft 14 associated with evaluations and/or ratings. Ratings are shared with other aerial vehicles 130 including those that are manned and unmanned as well as ground control units 134.

In accordance with an aspect of an exemplary embodiment, rotary wing aircraft 14 approaches a desired LZ. On approach, LZ sensors 91 capture LZ data associated with the LZ. As noted above, LZ data may include approach and departure corridors, other areas of interest (AOIs) or EOIs associated with the LZ. Data may also include terrain classification attributes (such as vegetation, terrain type), man-made classification attributes (such as power lines, urban, airfield), and/or mission classification attributes (such as enemy area, no-fly-zone, friendly area, delivery area) of the LZ.

The captured LZ data is compared to existing LZ data that may come from various sources such as satellite images, intelligence sources, other vehicles or the like. The LZ data is passed to LZ update controller 74 which begins to analyze the LZ. If landing continues, during touch down, aerial vehicle sensor inputs 88 capture various aerial vehicle data associated with touch down. The aerial vehicle sensor inputs 88 may provide feedback associated with ground conditions, weather conditions, and the like. The aerial vehicle data is passed to LZ evaluation and rating controller 77. During departure, LZ sensors 91 may capture and feed additional LZ data to LZ update controller 74.

LZ evaluation and rating sharing system 60 evaluates collected data to provide an updated, real time evaluation and rating for the LZ. That updated, real time evaluation and rating may then be communicated to other systems associated with rotary wing aircraft 14. For example, the updated, real time evaluation and rating may be relayed to other aerial vehicles that may be part of a sortie, aerial vehicles that are delivering supplies, evacuating ground personnel or the like. The updated, real time evaluation and rating may also be communicated to ground control systems to enhance mission effectiveness.

LZ ground truth, LZ Wind/Storm conditions, LZ enemy visibility and LZ landing or drop-off approach path data are important relevant data that keep changing quite rapidly, depending on the mission context. Current data is the most relevant data for determining LZ approachability and landing spots. Ground Battles last for days and weeks with multiple rotorcraft and fixed-wing sorties—i.e. multiple aircraft serving the same Area of Interest (AOI) delivering troops, supplies and dropping weapons. LZs could get destroyed, taken over by enemy, become visible to enemy, become open, unapproachable, etc.

Aircraft use previously known terrain data, previously known approach direction and no-fly zones/threat-zones to determine an optimal place to conduct the LZ mission. After completing (or aborting) a mission, mission data including successful or failed trajectories, LZ approach profiles and LZ ground truth is updated through a simplified operator interface that allows the operator to input compromised areas, exact LZs point and quality metrics, and perceived external conditions for that gets aggregated for that LZ AOI. This changing data is shared back to the base AND Aircraft immediately following the current aircraft. Sharing data, in accordance with an exemplary embodiment, will commonly include the all aircraft associated with a particular AOI, all bases associated with operating in that AOI, and a command base.

It is to be understood that the exemplary embodiments provide mission planners, as well as pilots, ground personnel and others a more detailed up-to-date look at a particular landing zone as well as approaches and departures. Decision making personnel are provided with real time information pertaining to one or more landing zones. The receipt of real time information enhances mission planning and performance reducing mission failure rates. Additionally, real time intelligence updates allow mission planners to determine impacts on arrival times, fuel rates and the like based on preceding aircraft visiting the landing zone. Real time intelligence also provides mission planners with options for potential new landing zones that may be better suited to mission requirements thereby further improving mission efficacy (distance, delivery, safety etc). Real time intelligence may also provide mission planners with details that would affect mission parameters including payload limits, needed fuel and the like.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A landing zone evaluation and rating sharing system comprising:
    a central processor unit (CPU);
    at least one sensor input operatively connected to the CPU;
    a communication controller operatively connected to the CPU, the communication controller being operable to pass data to other systems associated with the aerial vehicle; and
    a landing zone (LZ) evaluation controller operatively coupled to a non-volatile computer readable storage medium having computer readable program instructions embodied therewith, the computer readable program instructions being executable by the central processor unit to:
        receive data received through the at least one sensor input;
        evaluate the data to determine a LZ rating for a particular landing zone; and
        communicate the LZ rating to one or more systems associated with the aerial vehicle and to one or more additional aerial vehicles.

2. The landing zone evaluation and sharing system according to claim 1, further comprising: a LZ update controller, wherein data received through the at least one sensor input includes data received by the LZ update controller from sensors directed toward a LZ.

3. The landing zone evaluation and rating sharing system according to claim 2, wherein the data received from sensors directed toward the LZ includes data pertaining to one of physical attribute and a geometrical attribute of the LZ.

4. The landing zone evaluation and rating sharing system according to claim 2, wherein the sensors directed toward the LZ include one of a light detecting and ranging (LiDAR) sensor, a radio detection and ranging (RADAR) sensor, and cameras directed toward the LZ.

5. The landing zone evaluation and rating sharing system according to claim 1, wherein data received through the at least one sensor input includes data received through sensors arranged to detect a condition of the aerial vehicle.

6. The landing zone evaluation and rating sharing system according to claim 5, wherein the sensors arranged to detect a condition of the aerial vehicle include one or more of a weight on wheels (WOW) sensor, an embedded inertial navigation system (EGI) sensor, an inertial measurement unit (IMU) sensor, an engine torque sensor, a collective sensor.

7. The landing zone evaluation and rating sharing system according to claim 1, wherein the LZ rating communicated to one or more systems associated with the aerial vehicle includes communicating the LZ rating to one or more ground stations.

8. An aerial vehicle comprising:
an airframe;
a prime mover coupled to the airframe;
one or more aerodynamic surfaces supported by the airframe;
one or more support members supported by the airframe, the one or more support members operable to facilitate a transition between air operations and ground operations;
at least one sensor mounted to the airframe; and
a landing zone evaluation and rating sharing system comprising:
a central processor unit (CPU);
a landing zone (LZ) evaluation controller;
at least one sensor input operatively connected to the at least one sensor;
a communication controller operatively connected to the CPU, the communication controller being operable to pass data from the LZ evaluation controller to other systems associated with the aerial vehicle; and
a LZ evaluation controller operatively coupled to a non-volatile computer readable storage medium having computer readable program instructions embodied therewith, the computer readable program instructions being executable by the central processor unit to:
receive data received from the at least one sensor;
evaluate the data to determine a LZ rating for a particular landing zone; and
communicate the LZ rating to one or more systems associated with the aerial vehicle and to one or more additional aerial vehicles.

9. The aerial vehicle according to claim 8, further comprising: a LZ update controller, wherein the at least one sensor includes at least one sensor operatively coupled to the LZ update controller and directed toward a LZ.

10. The aerial vehicle according to claim 9, wherein the at least one sensor includes at least one of a light detecting and ranging (LiDAR) sensor, a radio detection and ranging (RADAR) sensor, cameras directed toward the landing zone.

11. The aerial vehicle according to claim 10, wherein the at least one sensor comprises an aerial vehicle sensor arranged to detect a condition of the aerial vehicle.

12. The aerial vehicle according to claim 11, wherein aerial vehicle sensor includes at least one of a weight on wheels (WOW) sensor, an embedded inertial navigation system (EGI) sensor, an inertial measurement unit (IMU) sensor, an engine torque sensor, a collective sensor.

13. The aerial vehicle according to claim 8, wherein the landing zone rating communicated to one or more systems associated with the aerial vehicle includes communicating the landing zone rating to one or more ground stations.

* * * * *